O. N. WEAVER.
Whiffletree.

No. 61,782.  Patented Feb. 5, 1867.

United States Patent Office.

OLIVER N. WEAVER, OF DOVER, KENTUCKY, ASSIGNOR TO HIMSELF AND GEORGE W. WINTER, OF AUGUSTA, KENTUCKY.

Letters Patent No. 61,782, dated February 5, 1867.

IMPROVEMENT IN UNHITCHING HORSES FROM VEHICLES.

*The Schedule referred to in these Letters Patent and making part of the same.*

TO WHOM IT MAY CONCERN:

Be it known that I, OLIVER N. WEAVER, of Dover, Mason county, Kentucky, have invented a new and useful Device for Unhitching Horses from Vehicles; and I hereby declare the following to be a full, clear, and exact description thereof, reference being had to the accompanying drawings making part of this specification.

Figure 1:
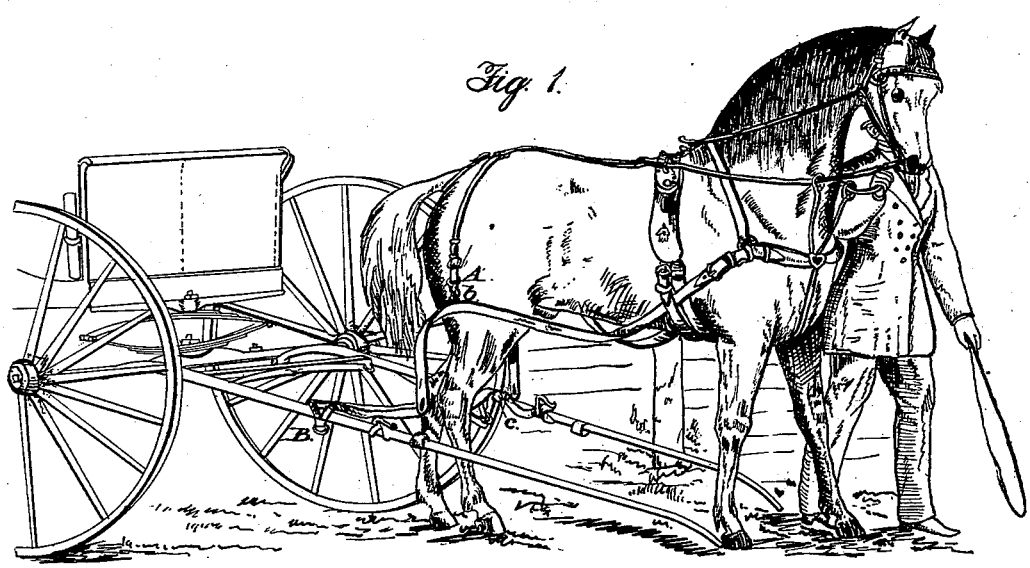
Figure 1 represents the horse unhitched from the shafts.
Figure 2:
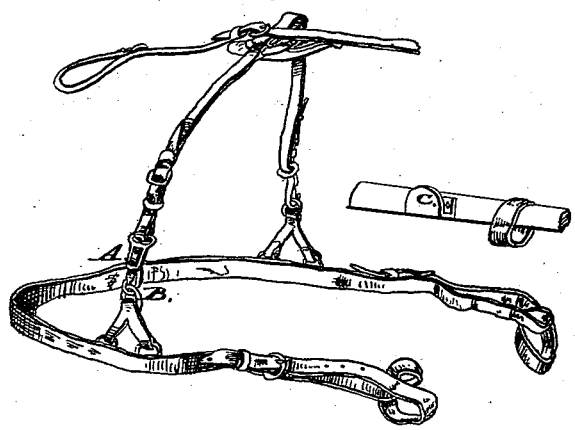
Figure 2 shows the breeching and its attachments on a larger scale.

This invention is designed to enable the hitching and unhitching of a horse to and from a vehicle without disturbing the connections of the hold-back strap with the shafts.

For this purpose I provide the hip strap of the breeching with snaps A, which engage in eyes or rings B in the breech strap, and are readily disengaged therefrom. I also provide the tugs or traces with rings, loops, or eyes $b$, which, when the snaps are disengaged from the breech straps, are made to engage with the aforesaid snaps on the hip strap so as, in conjunction with said strap, to hold the traces clear of the ground and to permit of the animal walking freely over from the shafts on unhitching the tugs from the whiffle-tree.

This arrangement, besides enabling the unhitching to be effected in a small fraction of the usual time, entirely dispenses with the necessity of tying or otherwise fastening up the tugs, and of unbuckling, unlapping, from around the shafts and again buckling up, the hold-back straps which is now necessary in order to keep them out of the mud.

It will be seen that the snaps in this arrangement, depending vertically, are not liable to become disengaged from their eyes; and, even if they were to become disengaged, the evil could not be serious, as the breech strap would remain resting upon the hocks of the animal. When unhitched, the breeching is temporarily supported by a hook, C, that projects from the inside of one or each of the shafts. The act of hitching is as quickly performed as that of unhitching, and consists in simply restoring the snaps to their places in the eyes of the breech strap and fastening the tugs. In this system of hitching it will never be necessary to disturb the connection of the breeching with the shafts except to adapt it to a different-sized horse.

I claim herein as new, and of my invention—

1. In the described combination a provision of the snaps A on the hip strap, and of the eyes, rings, or loops B $b$ upon the breeching and tugs for ready hitching and unhitching, as set forth.

2. The provision of the snaps A at the lower ends of the hip straps for the purpose set forth.

3. In combination with the elements of the first clause of claim I claim the hook C, projecting from the inside of the shaft to temporarily support the breeching when the horse is unhitched.

In testimony of which invention I hereunto set my hand.

O. N. WEAVER.

Witnesses:
GEO. H. KNIGHT,
JAMES H. LAYMAN.